(12) United States Patent
Reiter

(10) Patent No.: US 10,568,268 B2
(45) Date of Patent: Feb. 25, 2020

(54) TINE SUPPORT

(71) Applicant: Thomas Reiter, Schluesslberg (AT)

(72) Inventor: Thomas Reiter, Schluesslberg (AT)

( * ) Notice: Subject to any disclaimer, the term of this patent is extended or adjusted under 35 U.S.C. 154(b) by 93 days.

(21) Appl. No.: 15/561,439

(22) PCT Filed: Mar. 24, 2016

(86) PCT No.: PCT/EP2016/056600
§ 371 (c)(1),
(2) Date: Sep. 25, 2017

(87) PCT Pub. No.: WO2016/151095
PCT Pub. Date: Sep. 29, 2016

(65) Prior Publication Data
US 2018/0116120 A1 May 3, 2018

(30) Foreign Application Priority Data

Mar. 26, 2015 (DE) .......................... 10 2015 205 561

(51) Int. Cl.
*A01D 80/00* (2006.01)
*A01D 80/02* (2006.01)
*A01D 89/00* (2006.01)

(52) U.S. Cl.
CPC ........... *A01D 80/02* (2013.01); *A01D 89/002* (2013.01)

(58) Field of Classification Search
USPC .......................................................... 56/400
See application file for complete search history.

(56) References Cited

U.S. PATENT DOCUMENTS

| | | | | |
|---|---|---|---|---|
| 2,438,707 A | * | 3/1948 | Kropp ................. | A01B 33/144 172/556 |
| 2,527,887 A | | 10/1950 | Martin | |
| 2,987,866 A | * | 6/1961 | Ferris ................. | A01D 80/02 56/12.7 |

(Continued)

FOREIGN PATENT DOCUMENTS

| DE | 1872594 | 5/1963 |
|---|---|---|
| DE | 102006027078 | 12/2007 |

(Continued)

OTHER PUBLICATIONS

International Search Report and Written Opinion Application No. PCT/EP2016/056600 Completed: Jul. 7, 2016; dated Jul. 18, 2016 10 pages.

*Primary Examiner* — Thomas B Will
*Assistant Examiner* — Mai T Nguyen
(74) *Attorney, Agent, or Firm* — Ware, Fressola, Maguire & Barber LLP

(57) ABSTRACT

The invention relates to a tine support (10) for a crop collecting device for connecting at least two tines (12) to a shaft (50), one tine (12, 32) having a securing region (18). The invention is characterized in that the tine support (10, 30) comprises at least two support elements (14A, 14B, 34A, 34B) on which the securing region (18) of at least one tine (12, 32) can be secured. Furthermore, the support element (14A, 14B, 34A, 34B) has a connection region (24) via which a rotationally fixed connection to the shaft (50) can be produced, and the tine support (10, 30) has a clamping element (26, 38) which clamps the support elements (14A, 14B, 34A, 34B) in a removable manner with respect to the shaft (50).

21 Claims, 7 Drawing Sheets

(56) References Cited

U.S. PATENT DOCUMENTS

| | | | | |
|---|---|---|---|---|
| 3,212,585 A | * | 10/1965 | Bezzerides | A01B 39/08 |
| | | | | 172/142 |
| 3,308,612 A | * | 3/1967 | Oblinger | A01D 76/006 |
| | | | | 15/200 |
| 3,435,904 A | * | 4/1969 | Rice | A01B 21/02 |
| | | | | 172/556 |
| 3,478,500 A | * | 11/1969 | Rhoads | A01D 78/02 |
| | | | | 15/200 |
| 3,596,450 A | * | 8/1971 | Bowers | A01D 43/02 |
| | | | | 172/21 |
| 3,693,333 A | * | 9/1972 | Bishop | A01D 43/02 |
| | | | | 56/16.1 |
| 4,114,697 A | * | 9/1978 | Carlucci | A01B 21/04 |
| | | | | 172/543 |
| 4,344,273 A | * | 8/1982 | Jobling | A01B 45/026 |
| | | | | 56/16.7 |
| 4,616,714 A | * | 10/1986 | Lister | A01B 1/243 |
| | | | | 172/21 |
| 5,493,851 A | * | 2/1996 | Katzer | A01D 42/04 |
| | | | | 56/13.7 |
| 5,896,932 A | * | 4/1999 | Bruns | A01O 5/068 |
| | | | | 172/556 |
| 2014/0260171 A1 | | 9/2014 | McGehee et al. | |

FOREIGN PATENT DOCUMENTS

| | | |
|---|---|---|
| DE | 102013109684 | 3/2015 |
| EP | 2147590 | 1/2010 |
| EP | 2815639 | 12/2014 |

* cited by examiner

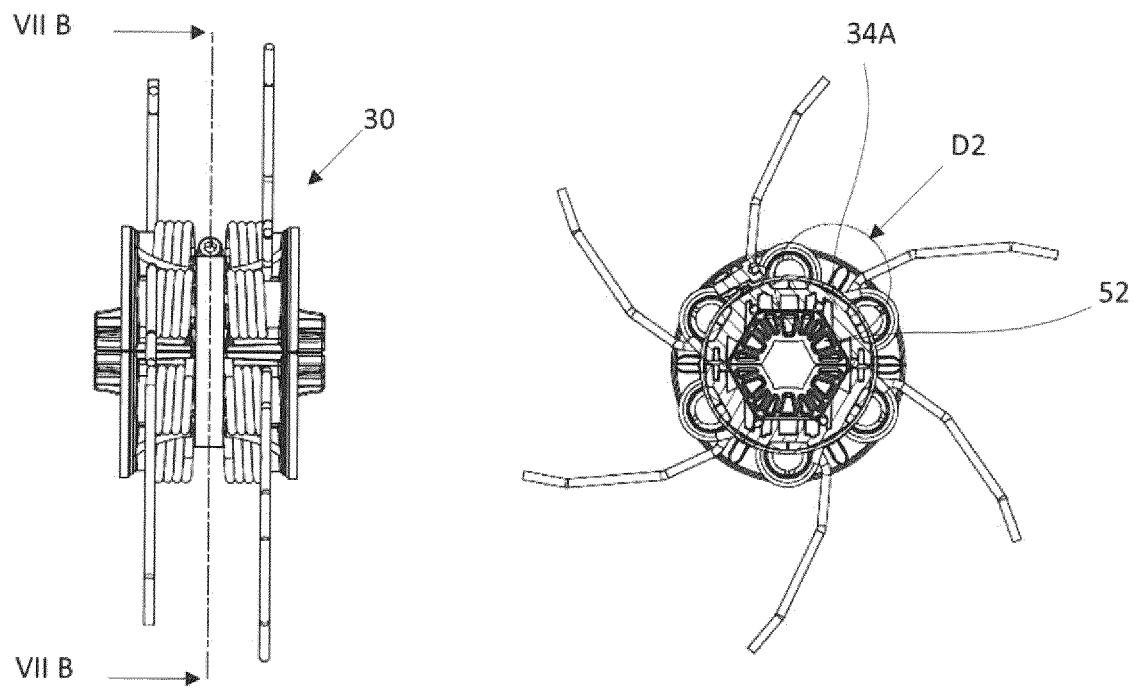
Fig. 7a
Fig. 7b
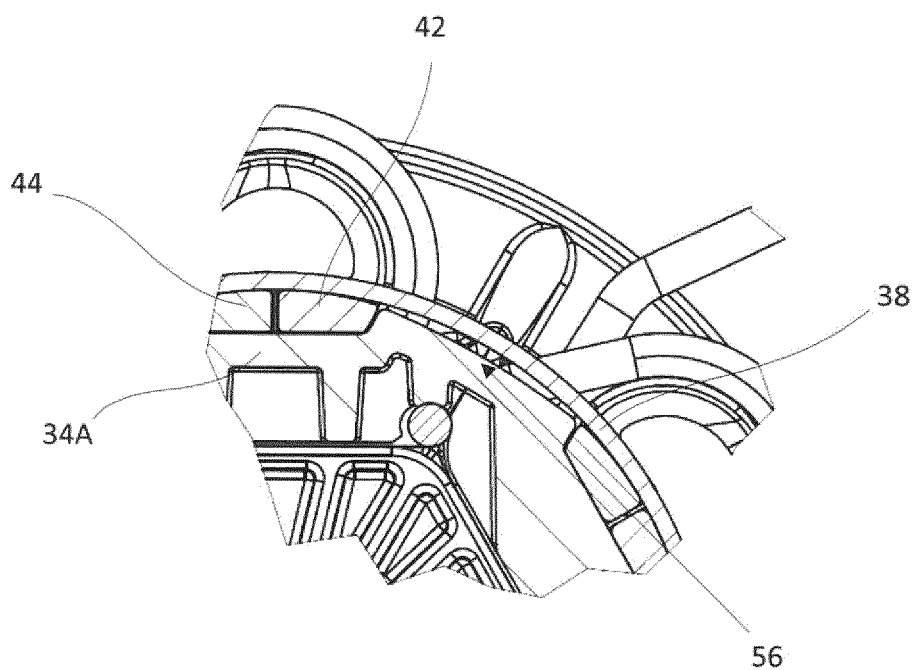
Fig. 7c

TINE SUPPORT

BACKGROUND

The invention relates to a tine support for a crop collecting device for connection of at least two tines to a shaft, with one tine being provided with a fastening region.

US 2014/0260171 A1 discloses a tine member for a crop collecting device which can be individually clamped onto a tube by means of a clamping ring and then screwed to the tube, said tube being part of a harvester reel which is rotated by a shaft.

EP 2 815 639 A1 discloses a harvester reel of a crop collecting device with a plurality of tine carriers, which harvester reel has individual tine carriers screwed to it for mounting individual tines. A similar arrangement in which individual tines are mounted on a drum is disclosed in DE 10 2013 109 684 A1.

DE 10 2006 027 078 A1 discloses a tine carrier for a crop collecting device which has double tines that are connected to a shaft via circular mounting members.

In this arrangement the mounting member has bores which are adapted to threadably receive holding elements therein, which holding elements in turn have tines threadedly mounted on them.

One disadvantage of this design is that, for a change of tines, all tine pairs have to be individually attached directly to the shaft because the support members are not connected to the shaft in an easily exchangeable manner.

SUMMARY

It is the object of the present invention to provide a tine support which can be mounted on the shaft and/or exchanged fast and easily.

This object is accomplished by providing a tine support for a crop collecting device for connection of at least two tines to a shaft, with one tine being provided with a fastening region wherein the tine support comprises at least two support elements on which at least one tine can be mounted via its fastening region, which support element furthermore has a connection region which can be used to produce a non-rotatable connection to the shaft, and the tine support includes a clamping member which detachably clamps the support elements to the shaft.

In a known manner, a tine support for a crop collecting device comprises at least two tines, one of which has a fastening region. The fastening region is used to connect the tine to a support element.

In accordance with the invention, the tine support comprises at least two support elements on which the fastening region of at least one tine each can be secured. The support elements furthermore have a connection region via which the tine support can be non-rotatably connected directly or indirectly to the shaft. The tine support furthermore has a clamping element which releasably clamps the support elements to the shaft.

This is a simple way of securing the support elements supporting the tines to the shaft in a non-rotatable manner.

In another advantageous embodiment of the invention, one support element may be designed as a half-shell, said support element including retaining structures capable of engaging the fastening region of a tine so as to positively lock the latter in the axial and circumferential directions.

Preferably, the clamping element may be in the form of a fastening clamp which may be capable of embracing the support elements, in particular the two half-shells. The clamping element preferably embraces the support element in the fastening region of the tines. This firstly allows the tines to be connected to the support element, and secondly the support elements themselves to be non-rotatably connected to the shaft. Preferably, one fastening clamp embraces the half-shells in the area of the retaining structures. The retaining structures thus act to fix the tines in the axial and circumferential directions, and the fastening clamp acts to fix the tines in the radial direction.

The fastening clamp may preferably include a spring-steel band.

In another advantageous embodiment the support elements, in particular the half-shells, may be connected in a hinge-like manner. This facilitates operation compared to a mere push-fit system.

The fastening region of the support elements may be designed such that the support element will also fix the tines in the radial direction, in particular in a force-fitting manner. This facilitates their mounting on a shaft. Final fixation is ensured by the fastening clamp which may preferably be made of metal.

In a known manner a tine may comprise at least one, in particular two, spiral winding portions, which makes the tine somewhat resilient, thus preventing the tines from being torn off easily. A tine, in particular a double tine, with two spiral winding portions will have its fastening region between the two spiral winding portions. In conventional tines, this fastening region is of a bow-shaped design and/or formed by a wire bent in a U- or a V-shape. As is known from DE 10 2006 027 078 A1 for example, a bolt is inserted through this fastening region and fixed on the opposite side. The tine is then positively fixed in the radial and axial directions and non-positively fixed in the circumferential direction.

According to the invention the fastening region on the support element may be formed as a raised portion matching the shape of the tines.

At the transition to the shaft, the support element has a connection region so as ensure a preferably positively fitting, non-rotatable connection to the shaft. More specifically, the connection region has a polygonal contour for this purpose. This contour is shaped to match the shaft or an intermediate member. Preferably, the connection region of the tine support is of a hexagonal shape for connection to a hexagon shaft.

In yet another advantageous embodiment of the invention, the tine support may comprise supporting elements with support structures thereon which structures axially extend through a tine with at least one spiral winding. This stabilizes the tine in the radial direction. The diameter of the support structure of the supporting member is slightly smaller than the diameter of the spiral winding. This allows necking of the spiral winding when a load acts on the tine.

The fact that the support structure extends through the spiral winding prevents the tine from being over-strained in particular in the fastening region when an excessive load acts on the tine. Moreover, this counteracts fatigue of the tine material since the tine leg rests directly on the support structure.

Since in practice the primary fracture point will be in the fastening region, the support structure prevents loss of a tine fractured in this point. This prevents consequential damage to harvesting equipment following behind the crop collecting device or injury to animals.

Preferably, the support structure which extends through the spiral winding of the tine is made of a plastic material.

As a result, the spiral winding will make "gentle" contact with the support structure when a major strain acts on it. This prevents any notching effect on the spiral winding, thus reducing the friction on the spiral winding.

Preferably, the supporting member is designed to match the support element. This means that the support element and the supporting member preferably map the same circle sector. Consequently, an assembly module consisting of the supporting member and the support element can be produced which facilitates the mounting of the overall system.

The supporting member is preferably produced as an injection-moulded part and may have a transfer region which non-rotatably connects the support element to the shaft.

The advantage of this design is that in particular in the case where the support element and the supporting member are formed as an injection-moulded part, they may advantageously have an axial demoulding direction. This gives the supporting member a wide contact surface for contact with the shaft.

In particular, the supporting member and the support element are matched to each other in such a way that they each have a connection region which allows the two elements to be connected to each other at least temporarily. This allows an assembly module to be produced in a pre-mounting step, thus considerably facilitating final mounting on the shaft.

Such a connection may be formed as a snap-fit connection and/or obtained through the clamping element.

For this purpose, the support element and the supporting member may be adapted to one another in such a way that the support element has latching regions which may be engaged by latching hooks formed on the supporting member so as to fix the supporting member and the support element in a non-positive/snap-locking manner relative to each other in the axial direction. This connection may be strengthened further by the fastening clamps.

In a preferred embodiment two supporting members can be connected axially to the support element on either side, with the support element and the supporting member being adapted to each other in such a way that the latching hooks engage the support element latching regions which face away from the mounting direction of the supporting member. This results in a more stable support because of the latching hooks engaging over these regions.

In case the tine support comprises double hooks, a separate supporting member may preferably be provided on either side. The two supporting members can be connected by means of a centrally located support element.

This allows a tine support half to be provided which supports a plurality of tines, in particular double tines, by way of a support element formed as a half-shell and two laterally interlocking supporting members. This tine support half can be combined with another half and secured to a shaft by means of a fastening clamp. This is a simple way of mounting a plurality of double tines on a shaft without having to remove the shaft.

In yet another advantageous embodiment of the invention the supporting member, in particular its support structure, may have a guide surface which can be used to guide the tines.

Preferably, the tine support may be designed such that the fastening clamp and the support element will be adapted to one another so as to result in areas of different surface pressure around the circumference once the fastening clamp has been tightly mounted.

Consequently, the fastening clamp, which preferably includes a spring steel clamping ring, will produce a higher preload because the regions of lower contact pressure will result in a shape of the fastening clamp, in particular of the clamping ring, which is polygon-like.

This means that if there is a shrinkage of the support element, such shrinkage can be tolerated for as long as the polygonal shape of the fastening clamps is retained, which still leaves sufficient clamping force to ensure that it is non-rotatably mounted on the shaft without any clearance. The difference between the outer circle radius and the inner circle radius is between 2% and 10% of the diameter of the outer circle.

Additional advantages, features and potential applications of the present invention may be gathered from the description which follows, in combination with the embodiments illustrated in the drawings.

BRIEF DESCRIPTION OF THE DRAWINGS

Throughout the description, claims and drawings, those terms and associated reference signs are used as are listed in the List of Reference Signs which follows below. In the drawings:

FIG. 7*a* is a front view of a tine support according to the invention;

FIG. 7*b* is a sectional view of the tine support according to the invention as shown in FIG. 7*a*, and FIG. 7*c* is a view of a detail of FIG. 7*b*.

DETAILED DESCRIPTION

Figure 1:
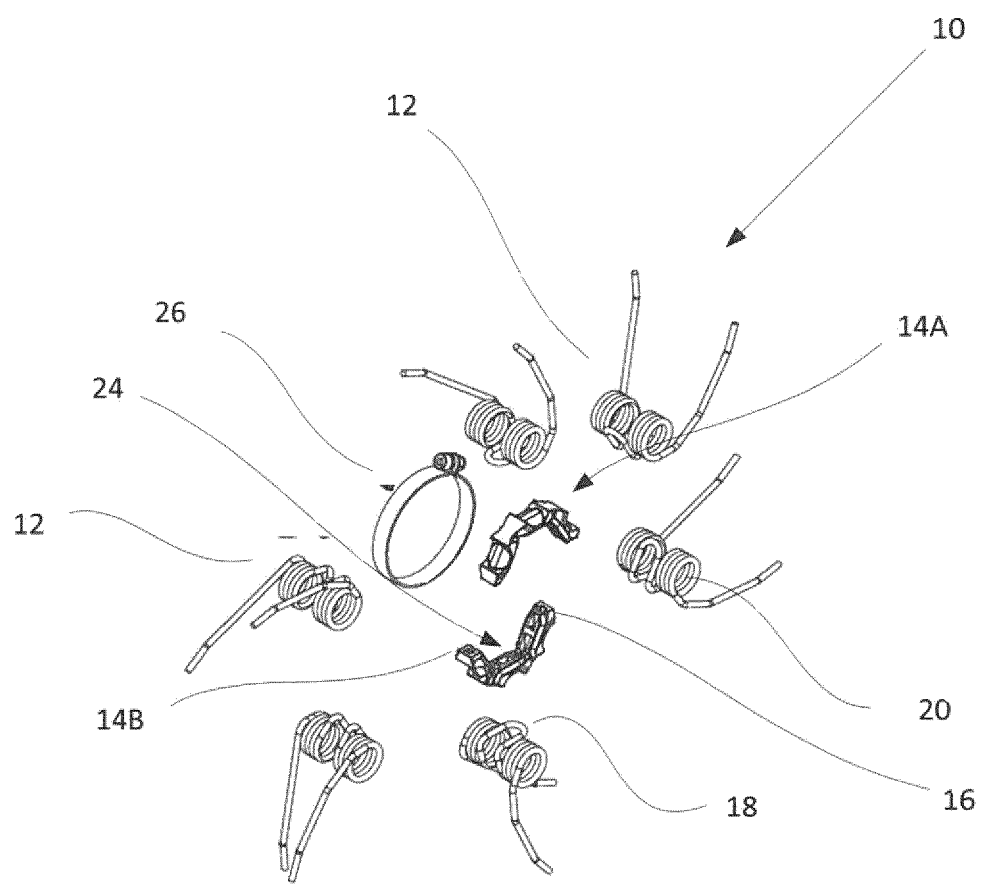
FIG. 1 is an exploded view of a tine support according to the invention.

FIG. 1 is an exploded view of a tine support 10 according to the invention. The tine support 10 comprises six double tines 12 which are supported by support half-shells 14A, 14B. The support half-shells 14A, 14B have mounting structures 16 which positively secure the double tines 12 in the axial and circumferential directions in that the mounting structures 16 pass through the fastening region 18 which is between the spring spirals 20 of the double tine 12. In this way, each support half-shell 14A, 14B supports three double tines 12. The manner in which the double tines 12 are received in the carrier half-shell 14A is described in more detail in FIG. 2.

The carrier half-shells 14A, 14B supporting the tines may embrace a shaft (not shown), in particular a hexagon shaft. A connection region 24 is provided on the radially inner portion of the carrier half-shells 14A, 14B for their non-rotatable connection to the shaft. The half-shells are thus mounted on the shaft in a way which is secure against rotation. The tine support 10 further comprises a fastening clamp 26 which clamps the double tines 12 and the carrier half-shells 14A, 14B tightly on the shaft. As is well-known, the fastening clamp 26 is tightened by means of a bolt member. This allows six double tines 12 to be simultaneously mounted on a shaft or replaced using a single bolt.

Figure 2:
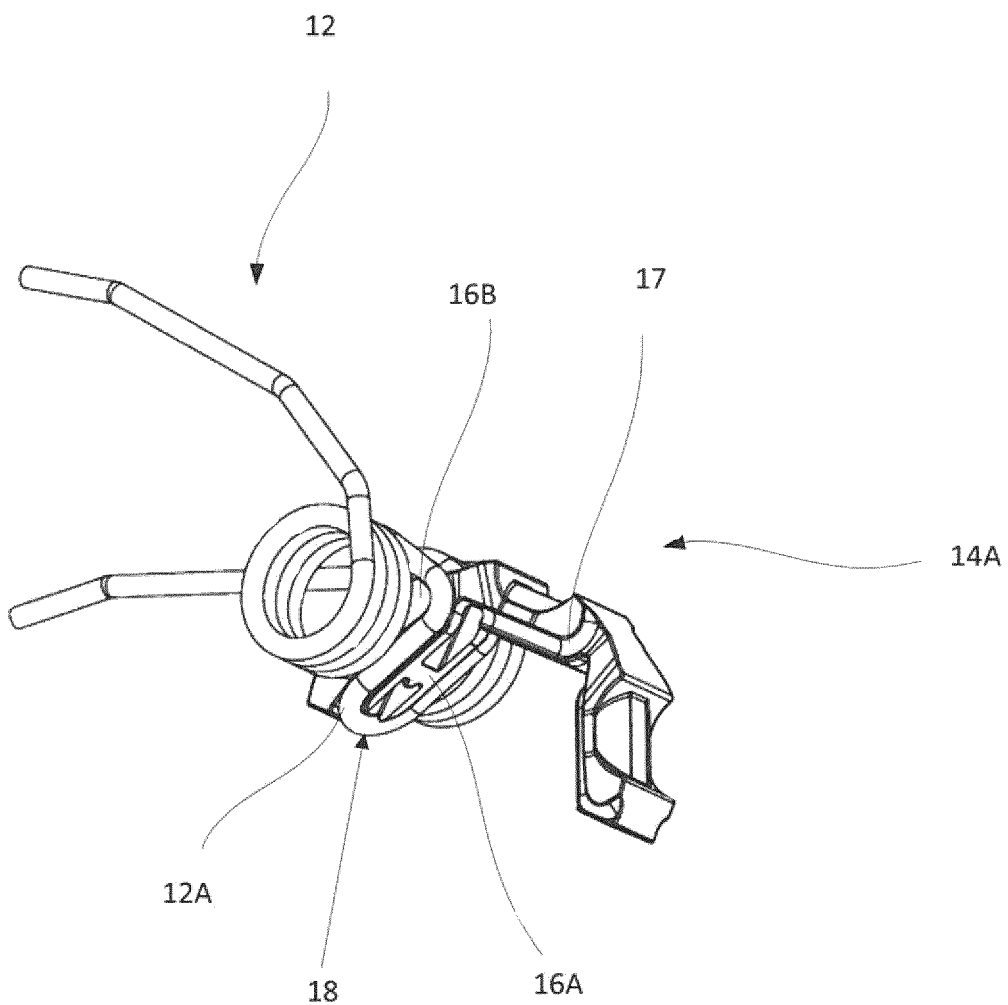
FIG. 2 is a perspective top view of the support half-shell with a double tine.

FIG. 2 is a perspective view of a carrier half-shell 14A, in which a double tine 12 is shown with its fastening region 12A. The fastening region 12A of the double tine 12 is of a U-shaped design. A mounting structure 16A radially extends through this region 12A and the mounting structure 16A fixes it laterally. In the direction of rotation of the tine support, the mounting structure 16B thus positively locates the double tine 12 in the axial and circumferential directions. The mounting structure 16 may be designed such that it also secures the double tine 12 in the radial direction, at least temporarily. In the embodiment illustrated, this is accomplished through grooves 17 made in the structure 16 which act to at least temporarily support and guide the tine 12. The double tines 12 are then finally fixed by the fastening clamp 26 of FIG. 1.

Figure 3:
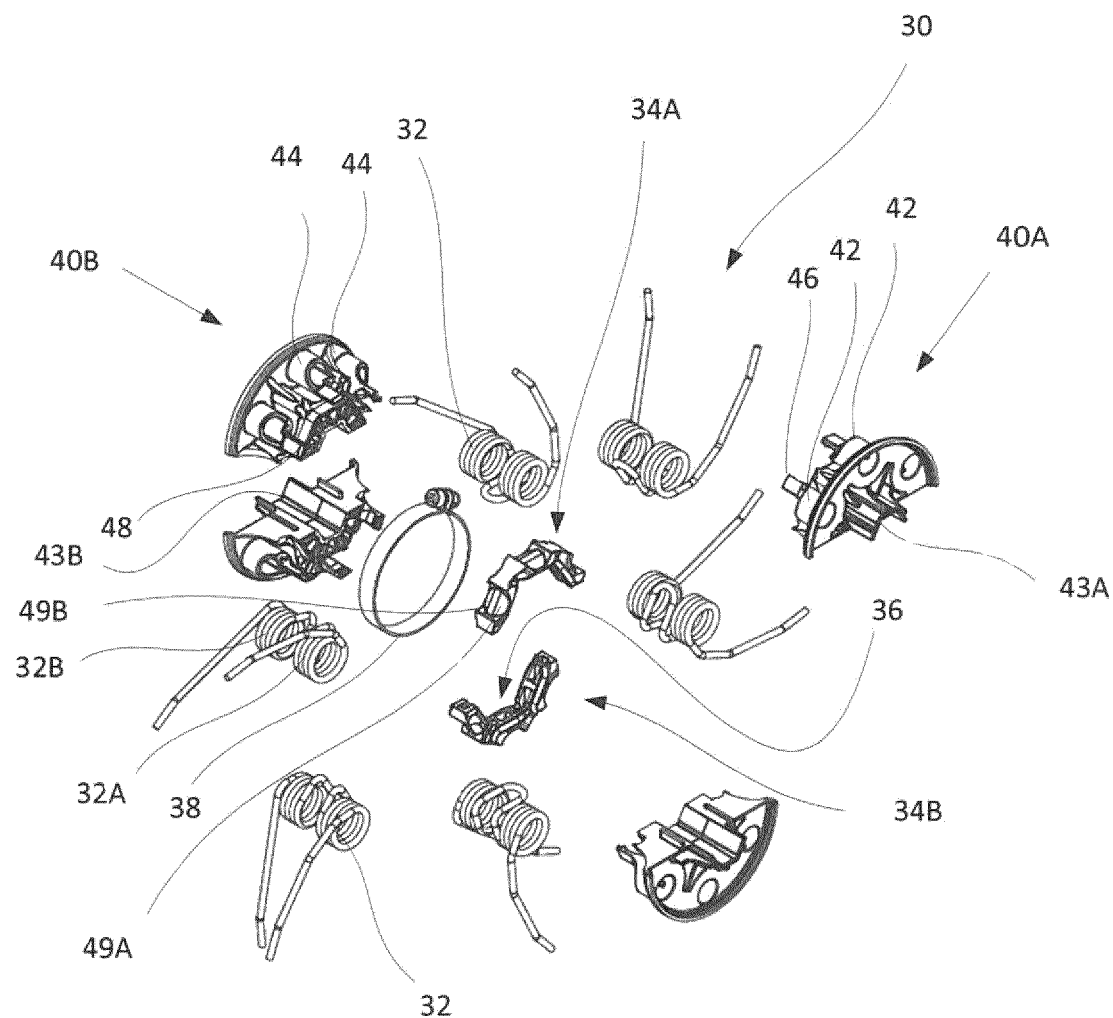
FIG. 3 is an exploded view of a tine support according to the invention.
Figure 4:
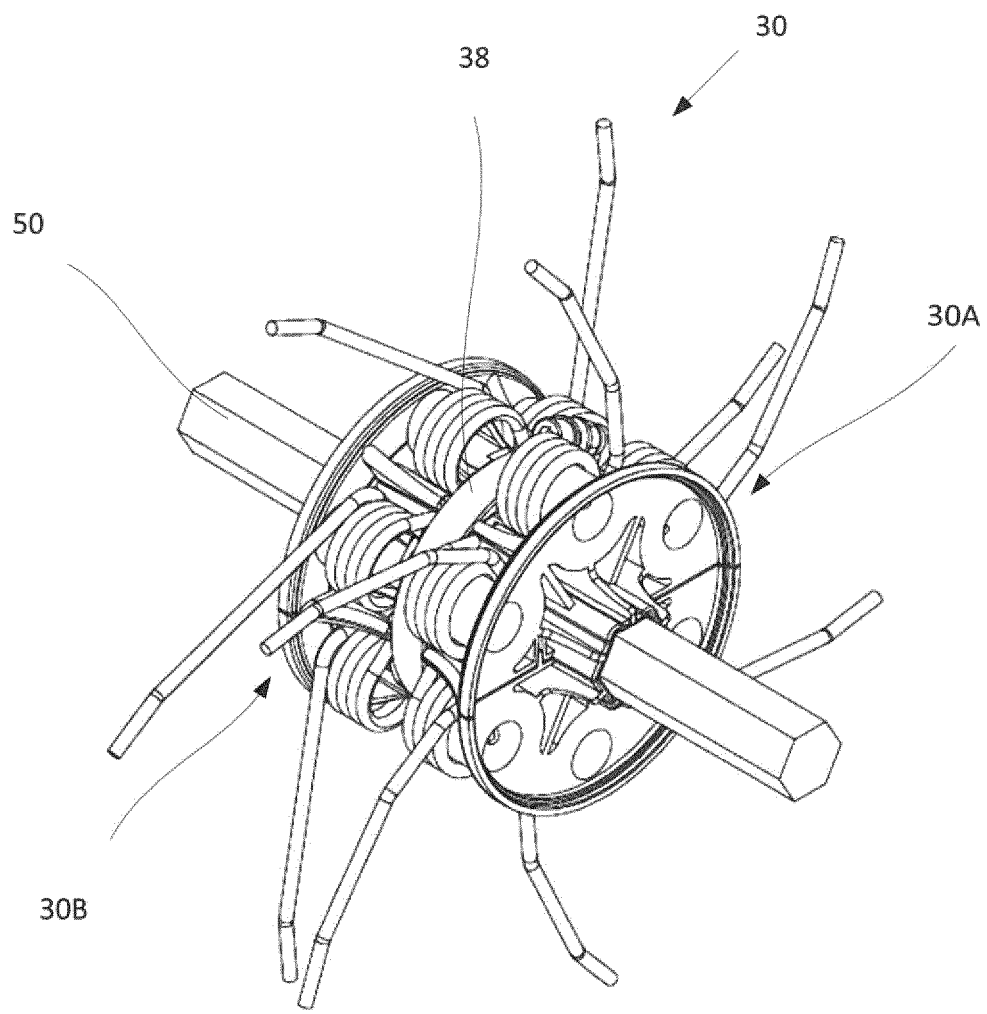
FIG. 4 is a perspective view of a tine support according to the invention.

FIG. 3 is an exploded view of a tine support 30 according to the invention. As seen in FIG. 3, the tine support 30 comprises six double tines 32, three of which are each mounted on a carrier half-shell 34A, 34B. Such mounting is performed by means of the mounting structures 36, as shown in FIG. 3, and by means of a fastening clamp 38. Associated with a support half-shell 34A, 34B each, the tine support 30 comprises two supporting members 40A, 40B each which have support structures 42, 44, each support structure 42 extending through an associated spiral spring portion 32A. The supporting members 40A, 40B likewise each have a connection region 43A, 43B with which the supporting member 40A, 40B rests on the shaft and is non-rotatably mounted thereon. This ensures that the double tines 32 are reliably guided and supported by the support structures 42, and this also holds the double tines 32 in place to prevent their loss. The supporting member 40B is of a similar structure, resulting in a support of both spiral spring portions 32A, 32B of a double tine 32. On their front end associated with the support half-shell 34A, 34B, the support structures 42, 44 feature latching means 46, 48 which engage latching flanks 49A, 49B on the support half-shell 34B. The support half-shell 34A thus acts to positively secure supporting members 40A, 40B in the radial and axial directions. This facilitates assembly of the tine support 30 since a support half-shell 34A, 34B with the double tines 32 and two supporting members 40A, 40B thereon already provides a tine support half-shell 30A as an assembly module. As shown in FIG. 4, two such assembly modules 30A, 30B can then be secured on a shaft 50 in a simple manner by means of the fastening clamp 38.

The aforementioned FIG. 4 is a perspective view of the tine support 30 which latter is composed of the two tine support halves 30A, 30B and secured to the shaft 50 by means of the fastening clamp 38.

Figure 5A:
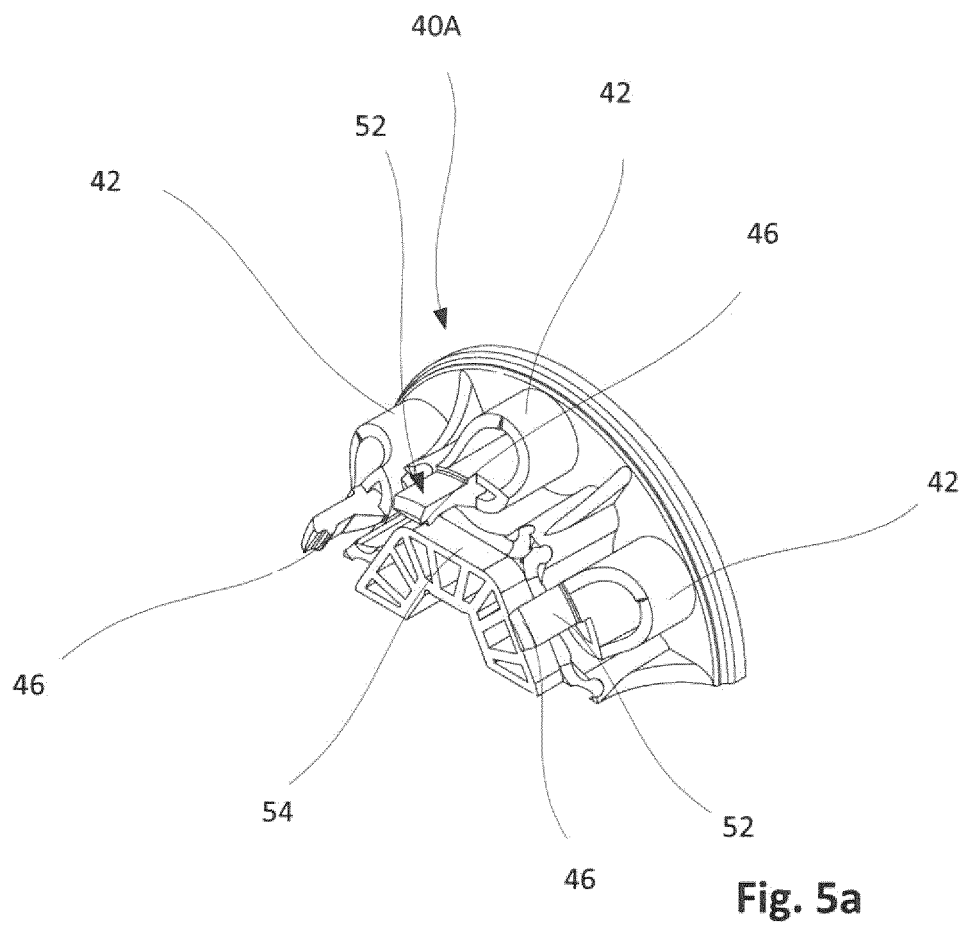
FIG. 5*a* is a perspective view of a supporting member.
Figure 5B:
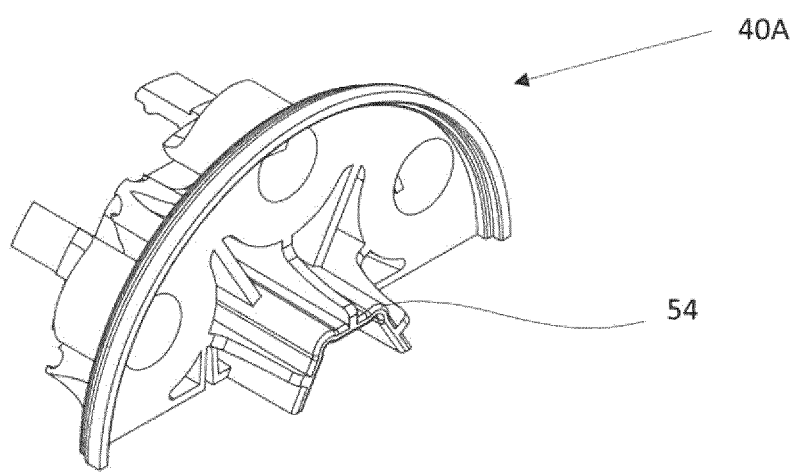
FIG. 5*b* is a perspective view of a supporting member.

FIG. 5a, 5b are perspective views of opposite sides a supporting member 40A. These views clearly show the support structures 42 which have latching means 46 on the front end, which latching means 46, as described with reference to FIG. 3, engage matching latching flanks 49A, 49B, thus positively locking the supporting members 40A, 40B and the support half-shell relative to one another in the axial direction. Moreover, a contact surface 52 is provided which can be used to guide the fastening clamp 38 and on which the fastening clamp 38 can retain the latching means 46 in engagement with the latching flanks 49A, 49B of the support half-shell. Furthermore, a transition region 54 can be seen in this view which is used to connect the support half-shell to the shaft. The connection region of the support half-shell will then abut on the transition region 54 and be non-rotatably supported thereon, thus allowing the support half-shell to be non-rotatably connected to the shaft via the transition region 54. The clamping force of the fastening clamp 38 is transferred via the support element (not shown) to the transition region 54 which in turn transfers it to the shaft (not shown).

As seen in FIG. 5b, the transition region also extends to the side facing away from the support element, which thus creates a larger contact surface. Moreover, this portion can be used to predetermine a desired installation distance.

Figure 6A:
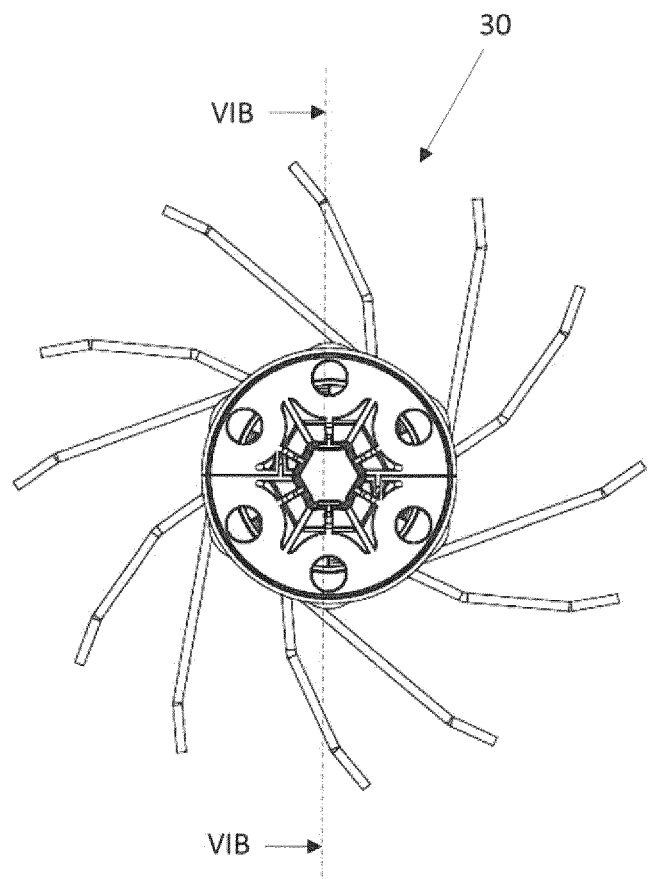
FIG. 6*a* is a lateral view of an assembled tine support.
Figure 6B:
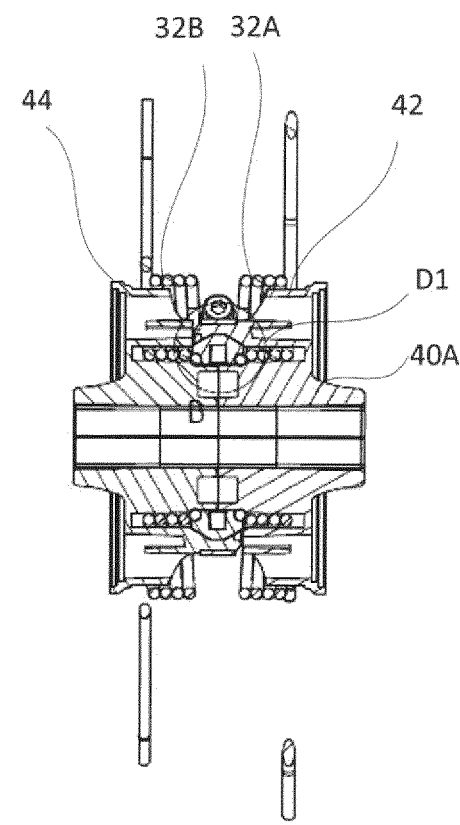
FIG. 6*b* is a sectional view of a tine support according to the invention as shown in FIG. 6*a*.

FIG. 6a is a lateral view of an assembled tine support 30 of the type shown in FIG. 3, in which a section along lines VIB-VIB is indicated that is shown in the view of FIG. 6b. This view shows how the support structures 42, 44 each extend through the spiral spring portions 32A, 32B of the double tine 12. A detail D1 is marked in FIG. 6b which is illustrated in the enlarged view in FIG. 6c. The tine support 30 has four identical supporting members 40A, 40B, as described with reference to the views of FIGS. 5a and 5b.

Figure 6C:
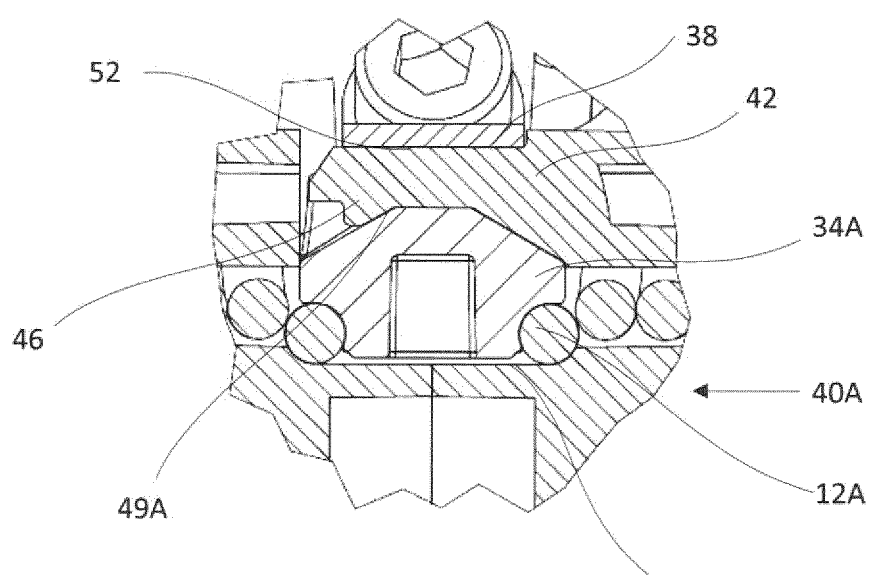
FIG. 6*c* is a view of a detail of FIG. 6*b*.

FIG. 6c is an enlarged view of the detail D1 of FIG. 6b. The support structure 42 of the supporting member 40A extends through the spiral portion 32A of the double tine 12 mounted on the support half-shell 34A. The fastening clamp 38 is guided on the contact surface 52 of the support structure 42. Opposite the contact surface 52, a latching means 46 is disposed which comes into a force and positive fit with the latching flank 49A. The radial pressure generated by the fastening clamp 38 firstly acts to retain the connection of the latching flank 49A and the latching means 46, and secondly it clamps the fastening region 12A of the double tine 12 between the support half-shell 34A and the transition region 54 of the support structure 42. The latching means 46 is disposed on the side of the support half-shell 34A opposite the supporting member 40A. In this way, the support structures 42, 44 of the supporting members 40A, 40B disposed opposite each other, which structures are mounted along the circumference in an alternatingly overlapping manner, will contribute to a more stable connection of the support half-shell 34A and the supporting members 40A, 40B so as to form a tine support half-shell 30A.

FIG. 7a is a front view of a tine support 30 according to the invention with sectional lines VIIB-VIIB marked in.

FIG. 7b is a sectional view of the tine support 30 according to the invention. The view of FIG. 7b shows the rib structure of the transition region 52 for transferring the clamping forces from the support half-shell 34A to the shaft. This rib structure allows an ideal introduction of force over a vast area and does not require a major amount of material. Furthermore, the detail D2 shown in an enlarged view in FIG. 7c is indicated in FIG. 7b.

FIG. 7c is an enlarged view of the detail D2 indicated in FIG. 7b. The clamping ring 38 lies over the guide region formed by the support structures 42, 44 at least partially engaging over the carrier half-shell 34A. This enlarged detail clearly shows that the intermediate region 56 of the support half-shell 34A is within the envelope circle having a radius predetermined by the support structures 42, 44. This arrangement allows the fastening clamp 38 to exert a higher surface pressure on the support half-shell 34A in the area of the support structures 42, 44 than in the intermediate region 56. If the diameter of this arrangement embraced by the fastening clamp diminishes in the course of time due to material shrinkage, the clamp can thus also ensure a clearance-free non-rotatable connection to the shaft even if the diameter is reduced. This reduces wear and thus allows for long operating times without having to adjust the fastening clamp 38.

LIST OF REFERENCE SIGNS 10 tine support
12 double tine 12A fastening region
14A carrier half-shell
14B carrier half-shell
16A mounting structure
16B mounting structure
17 groove
18 fastening region
20 spring spiral
24 connection region
26 fastening clamp
30 tine support
30A tine support half-shell
30B tine support half-shell
32 double tines
32A spiral spring portion
32B spiral spring portion
34A carrier half-shell
34B carrier half-shells
36 mounting structure
38 fastening clamp
40A supporting member
40B supporting member
42 support structure
43A connection region
43B connection region
44 support structure
46 latching means
48 latching means
49A latching flank
49B latching flank
50 shaft
52 transition region
54 transition region
56 intermediate region

The invention claimed is:

1. A tine support (10) for a crop collecting device comprising at least two tines (12) for connection to a shaft (50), each tine (12, 32) provided with a fastening region (18), wherein the tine support (10, 30) comprises at least two support elements (14A, 14B, 34A, 34B) on which at least one tine (12, 32) is mountable via its fastening region (18), each support element (14A, 14B, 34A, 34B) having a connection region (24) provided to produce a non-rotatable connection to the shaft (50), and the tine support (10, 30) includes a clamping member (26, 38) that detachably clamps the support elements (14A, 14B, 34A, 34B) to the shaft (50), wherein each tine of the at least two tines (12, 32) includes at least one spiral winding (20, 32A, 32B), and wherein a support element (14A, 14B, 34A, 34B) is connectable to at least one supporting member (40A, 40B), said supporting member (40A, 40B) having support structures (42, 44) that axially extend through the at least one spiral winding (20, 32A, 32B).

2. A tine support (10) for a crop collecting device comprising at least two tines (12) for connection to a shaft (50), each tine (12, 32) provided with a fastening region (18), wherein the tine support (10, 30) comprises at least two support elements (14A, 14B, 34A, 34B) on which at least one tine (12, 32) is mountable via its fastening region (18), each support element (14A, 14B, 34A, 34B) having a connection region (24) provided to produce a non-rotatable connection to the shaft (50), and the tine support (10, 30) includes a clamping member (26, 38) that detachably clamps the support elements (14A, 14B, 34A, 34B) to the shaft (50), wherein the clamping member transfers radial clamping forces to the shaft via the support elements.

3. The tine support according to claim 2, wherein the clamping member (26, 38) comprises a fastening clamp (26, 38) that engages around the support elements (14A, 14B, 34A, 34B).

4. The tine support according to claim 3, wherein the fastening clamp (38) and each support element (34A, 34B) are adapted to each other so as to result in areas of different surface pressure around the circumference once the fastening clamp (38) has been tightly mounted.

5. The tine support according to claim 2, wherein each tine of the at least two tines (12, 32) includes at least one spiral winding (20, 32A, 32B).

6. The tine support according to claim 5, wherein each tine of the at least two tines (12, 32) includes two spiral windings (20, 34A, 34B) between which the fastening region (18) is located.

7. The tine support according to claim 5, wherein a support element (14A, 14B, 34A, 34B) is connectable to at least one supporting member (40A, 40B), said supporting member (40A, 40B) having support structures (42, 44) that axially extend through the at least one spiral winding (20, 32A, 32B).

8. The tine support according to claim 7, wherein one support element (34A, 34B) each is connected to two supporting members (40A, 40B).

9. The tine support according to claim 7, wherein each support structure has a latching structure (46, 48) that is latchable to a matching mounting flank (49A, 49B) on a corresponding support element of the at least two support elements (34A, 34B).

10. The tine support according to claim 9, each latching structure (46, 48) of the support structure and the matching mounting flank (49A, 49B) of the support element is arranged such that a latching position is on a side of the support element (34A, 34B) that faces away axially from the supporting member (40A, 40B), resulting in the supporting member (40A, 40B) to at least partially engage over the support element (34A, 34B).

11. The tine support according to claim 10, wherein the supporting member (40A, 40B) has a transition region (54) via which the support element (34A, 34B) is non-rotatably connectable to the shaft (50).

12. A tine support (10) for a crop collecting device comprising at least two tines (12) for connection to a shaft (50), each tine (12, 32) provided with a fastening region (18), wherein the tine support (10, 30) comprises at least two support elements (14A, 14B, 34A, 34B) on which at least one tine (12, 32) is mountable via its fastening region (18), each support element (14A, 14B, 34A, 34B) having a connection region (24) provided to produce a non-rotatable connection to the shaft (50), and the tine support (10, 30) includes a clamping member (26, 38) that detachably clamps the support elements (14A, 14B, 34A, 34B) to the shaft (50), wherein the clamping member transfers radial clamping forces via the support element to a transition region which in turn transfers the radial clamping forces to the shaft.

13. The tine support according to claim 12, wherein the clamping member (26, 38) comprises a fastening clamp (26, 38) that engages around the support elements (14A, 14B, 34A, 34B).

14. The tine support according to claim 12, wherein each tine of the at least two tines (12, 32) includes at least one spiral winding (20, 32A, 32B).

15. The tine support according to claim 14, wherein each tine of the at least two tines (12, 32) includes two spiral windings (20, 34A, 34B) between which the fastening region (18) is located.

16. The tine support according to claim 14, wherein a support element (14A, 14B, 34A, 34B) is connectable to at least one supporting member (40A, 40B), said supporting member (40A, 40B) having support structures (42, 44) that axially extend through the at least one spiral winding (20, 32A, 32B).

17. The tine support according to claim 16, wherein each support structure has a latching structure (46, 48) that is latchable to a matching mounting flank (49A, 49B) on a corresponding support element of the at least two support elements (34A, 34B).

18. The tine support according to claim 17, each latching structure (46, 48) of the support structure and the matching mounting flank (49A, 49B) of the support element is arranged such that a latching position is on a side of the support element (34A, 34B) that faces away axially from the supporting member (40A, 40B), resulting in the supporting member (40A, 40B) to at least partially engage over the support element (34A, 34B).

19. The tine support according to claim 18, wherein the supporting member (40A, 40B) has a transition region (54) via which the support element (34A, 34B) is non-rotatably connectable to the shaft (50).

20. The tine support according to claim 13, wherein the fastening clamp (38) and each support element (34A, 34B) are adapted to each other so as to result in areas of different surface pressure around the circumference once the fastening clamp (38) has been tightly mounted.

21. The tine support according to claim 16, wherein one support element (34A, 34B) each is connected to two supporting members (40A, 40B).

* * * * *